(12) United States Patent  
Phillips

(10) Patent No.: US 10,150,424 B1
(45) Date of Patent: Dec. 11, 2018

(54) ADJUSTABLE RETENTION ARM FOR A BIKE CARRIER

(71) Applicant: Cal M. Phillips, Platteville, WI (US)

(72) Inventor: Cal M. Phillips, Platteville, WI (US)

( * ) Notice: Subject to any disclaimer, the term of this patent is extended or adjusted under 35 U.S.C. 154(b) by 0 days.

(21) Appl. No.: 16/108,258

(22) Filed: Aug. 22, 2018

Related U.S. Application Data

(60) Continuation-in-part of application No. 15/984,388, filed on May 20, 2018, now Pat. No. 10,086,769, and a continuation-in-part of application No. 15/872,065, filed on Jan. 16, 2018, now Pat. No. 10,065,568, which is a division of application No. 15/396,710, filed on Jan. 2, 2017, now Pat. No. 9,956,922.

(51) Int. Cl.
  *B60R 9/10* (2006.01)
  *B60R 9/04* (2006.01)
  *B60R 9/06* (2006.01)

(52) U.S. Cl.
  CPC .................. *B60R 9/10* (2013.01); *B60R 9/04* (2013.01); *B60R 9/06* (2013.01)

(58) Field of Classification Search
  CPC ........... B60R 9/045; B60R 9/048; B60R 9/06; B60R 9/08; B60R 9/10; B60R 2011/0064; B60R 2011/0071; B60R 2011/0084
  See application file for complete search history.

(56) References Cited

U.S. PATENT DOCUMENTS

| 3,116,836 A | | 1/1964 | McCauley | |
|---|---|---|---|---|
| 3,169,028 A | | 2/1965 | Scrivner | |
| 3,355,028 A | * | 11/1967 | Mork | B62H 3/06 211/21 |
| 3,529,737 A | * | 9/1970 | Daugherty | B60R 9/06 224/924 |
| 3,843,001 A | * | 10/1974 | Willis | B60P 3/122 224/402 |
| 3,861,533 A | * | 1/1975 | Radek | B62H 3/08 211/20 |
| 3,912,119 A | | 10/1975 | Hill | |
| 5,445,300 A | * | 8/1995 | Eipper | B60R 9/06 224/496 |
| 5,653,512 A | | 8/1997 | Phillips | |
| 5,833,074 A | * | 11/1998 | Phillips | B60R 9/10 211/21 |
| 6,460,743 B2 | * | 10/2002 | Edgerly | B60R 9/048 224/324 |

(Continued)

*Primary Examiner* — Corey N Skurdal

(74) *Attorney, Agent, or Firm* — John V. Stewart

(57) ABSTRACT

A bike carrier has H-shaped or inverted U-shaped wheel retention arms that pivot inward to press a cross member of each retention arm against each tire. Each cross member is infinitely adjustable along elongated slots in side arms of the retention arm for different wheel diameters. Each cross member has a shaft passing through the elongated slots, and a tool-less tensioner that fixes and releases the cross member to the side arms at selectable positions. The tensioner may be a cam lever as used on bicycle wheel quick-release hubs or a transversely threaded lever that acts as both a nut and a wrench on a threaded end of the shaft of the cross member A retention arm pivot ratchet holds each retention arm inward, pressing the cross member against the bike tire. A trailer hitch embodiment of the carrier has two bike wheel trays that pivot forward together for storage.

14 Claims, 5 Drawing Sheets

(56) References Cited

U.S. PATENT DOCUMENTS

| | | | |
|---|---|---|---|
| 8,763,870 B2 * | 7/2014 | Davis | B60R 9/10 224/319 |
| 2003/0071097 A1 * | 4/2003 | Dean | B60R 9/048 224/319 |
| 2010/0080650 A1 | 4/2010 | Gorza | |

* cited by examiner

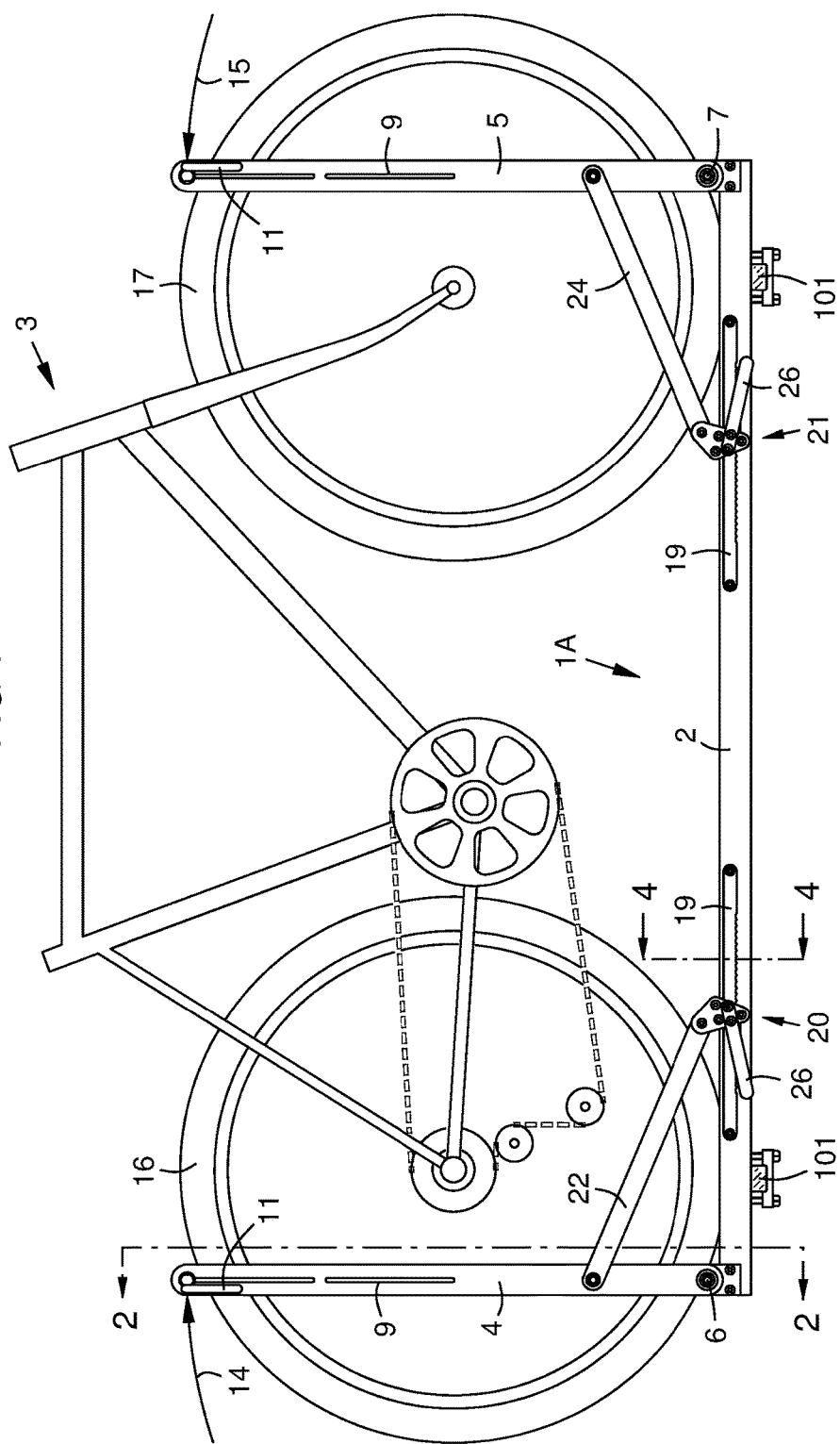

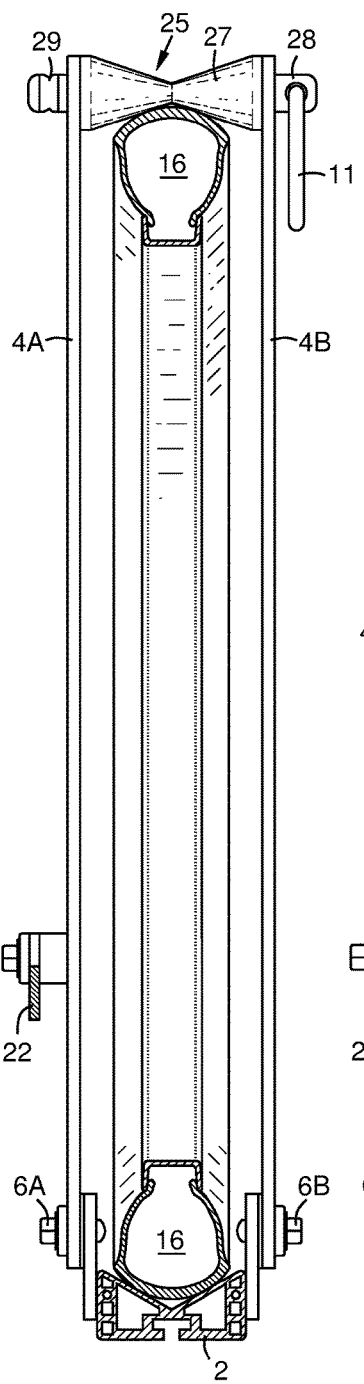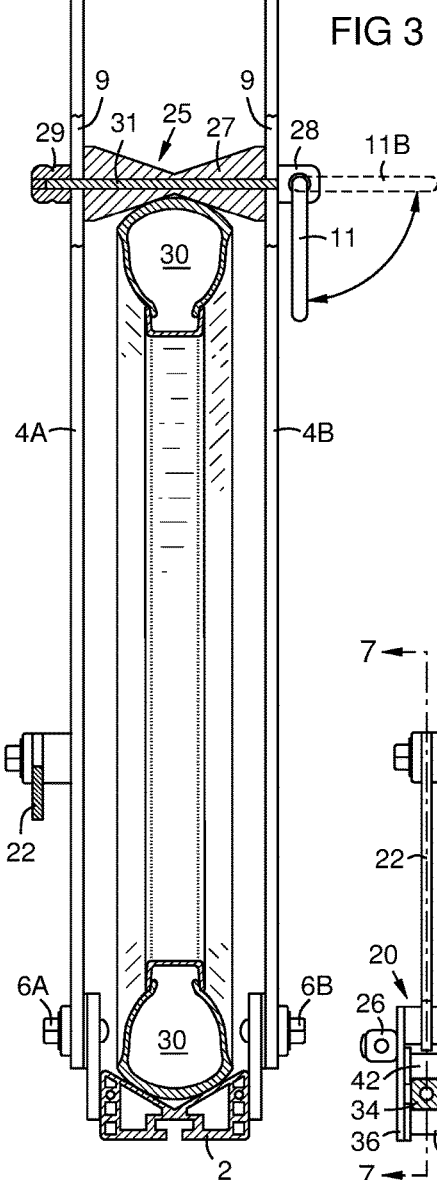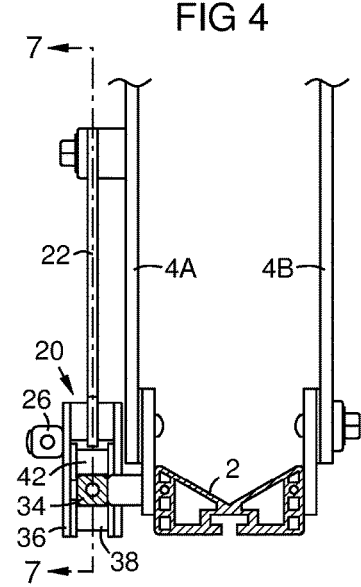

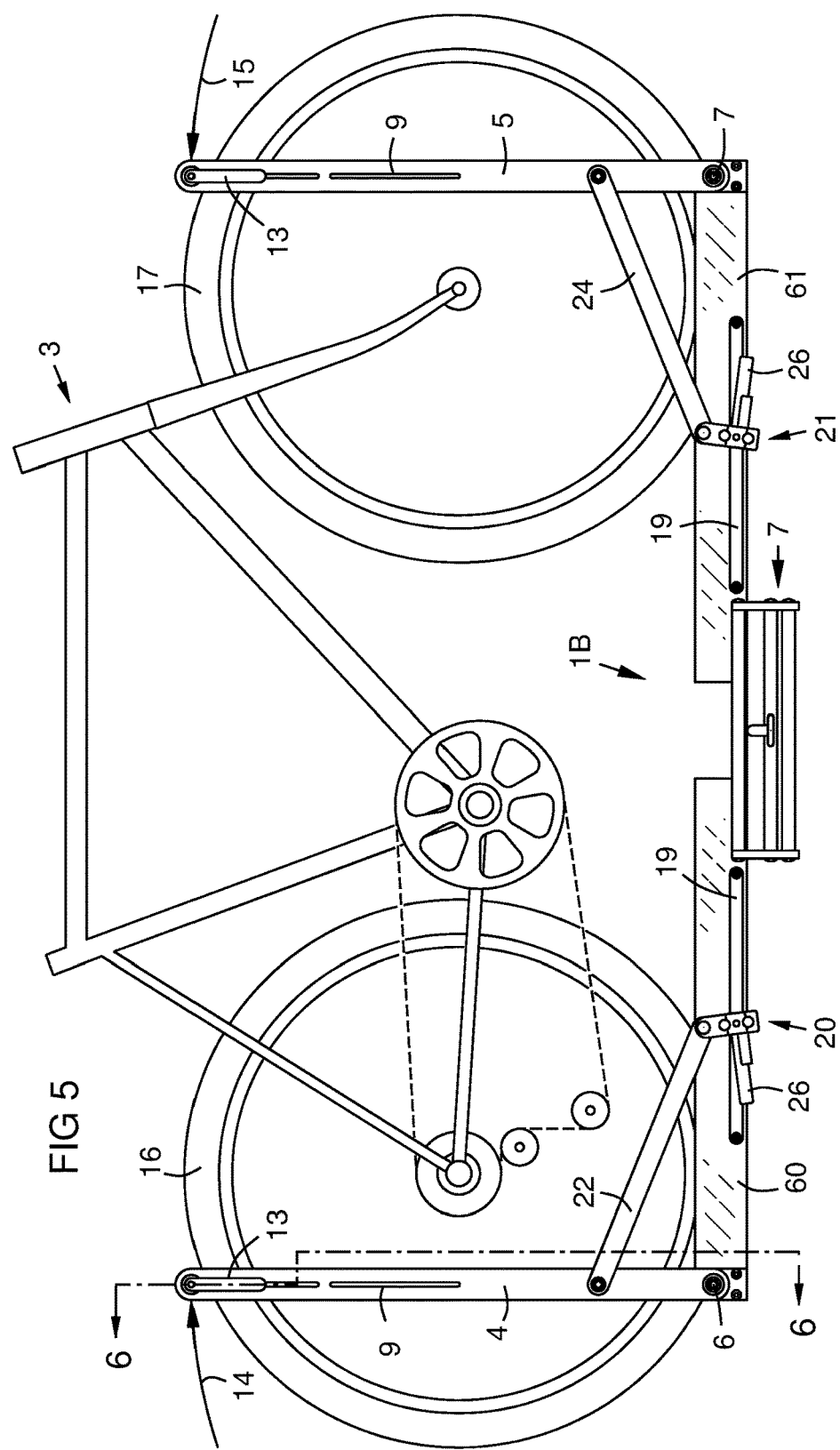

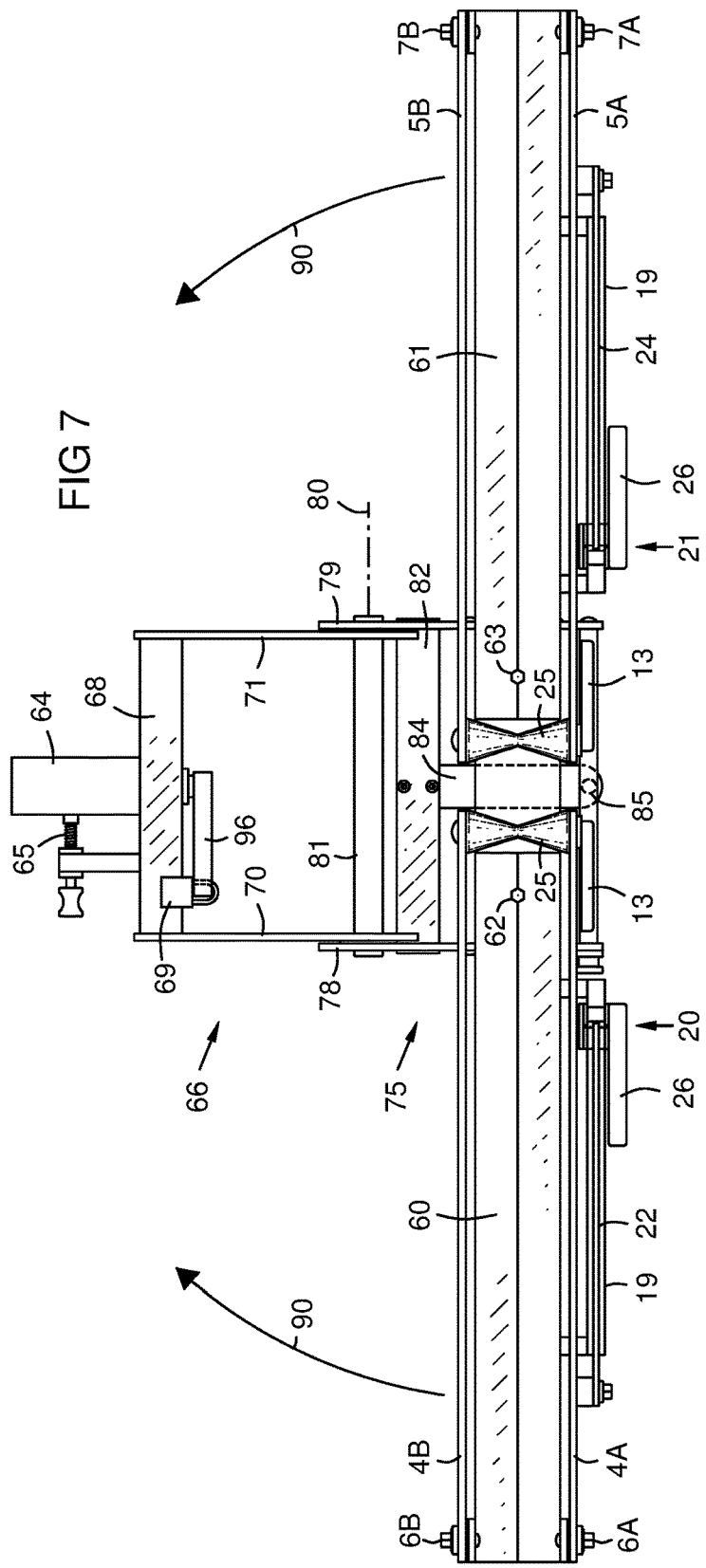

ADJUSTABLE RETENTION ARM FOR A BIKE CARRIER

CROSS-REFERENCE TO RELATED APPLICATIONS

This application is a continuation-in-part of U.S. patent application Ser. No. 15/872,065 filed Jan. 16, 2018, which is a division of U.S. patent application Ser. No. 15/396,710 filed Jan. 2, 2017, now U.S. Pat. No. 9,956,922 issued May 1, 2018, which is incorporated herein by reference. This application is also a continuation-in-part of U.S. patent application Ser. No. 15/984,388 filed May 20, 2018, which is incorporated herein by reference

FIELD OF THE INVENTION

This invention relates to carriers for two-wheeled vehicles, and particularly to bicycle carriers for mounting on a motor vehicle roof rack or trailer hitch receiver.

BACKGROUND OF THE INVENTION

Racks for carrying bikes on motor vehicles often use hangers, clamps, straps, or cams to hold the bike in the rack. These require multiple operations to secure or release the bike. Hangers and clamps can mar the finish of a bike assembly during vibration of a traveling vehicle. Straps are subject to loosening, tearing, and deterioration.

Bike wheels should not be free to spin in the slipstream of a motor vehicle, and the steering wheel of the bike should not be free to turn. Otherwise, damage to the bike and/or the motor vehicle can result. Many racks do not inherently secure the wheels, relying on the competence and discretion of the user to do so with straps.

U.S. Pat. No. 4,875,608 (Graber) shows a folding bike carrier mounted on the rear of a vehicle. Each wheel is strapped to a tray, and the bike assembly is clamped to the carrier. This design secures the wheels, but the straps and clamps have the disadvantages described above.

U.S. Pat. No. 3,659,762 (Kravitz) shows a bike carrier with deep wells for holding a bike by its wheels. The bike must be strapped to the wells, since it is not clamped by them. Otherwise the bike could fly upward during a bump in the road. There is no adjustment for different sized bikes, so the wells are a loose fit, requiring straps to eliminate play of the bike within the wells.

Some bike carriers require removal of the front wheel, and bolting or clamping of the front dropouts to the carrier. This is inconvenient, even with a quick-release hub on the bike and/or a quick-release dropout clamp on the carrier. The front wheel must be strapped individually to the carrier or stowed elsewhere, possibly bending the rim or spokes, or scratching the carrier or vehicle.

The present inventor has commercial success with a bike carrier described in part in U.S. Pat. No. 5,833,074, filed May 6, 1995. Since this patent issued the inventor has improved the design, added a trailer hitch receiver embodiment, and has sold both roof rack and hitch receiver versions through his company, 1 up USA. The bike carrier described herein incorporates aspects from the above patent '074, plus intervening improvements that have been on sale for more than a year, and further improvements. Relevant intervening improvements applicable to both the roof rack and the hitch receiver versions include the following:

a) Wheel retention arms with two parallel side arms and a cross member, which, in combination, form an H-shape or inverted U-shape depending on the position of the cross member, which can be adjusted for different sized bike tires. Adjustment requires a wrench and is limited to a selection of alternate bolt holes on the parallel side arms. It is not infinitely adjustable.

b) The pivotal position of each wheel retention arm is controlled by a linear ratchet with shallow, symmetric ratchet teeth. The pawl can be over-rotated by the user in the release direction, causing drag on the pawl movement while opening the wheel retention arms.

A trailer hitch receiver version of the bike carrier with the following relevant features has been on sale for over a year: A tray assembly on a trailer hitch drawbar has two aligned bicycle wheel trays that receive the front and back wheels of a bike. The trays pivot forward together over the drawbar for compact shipping and storage without disassembly. The trays lock in the deployed position by respective levers that contact each tray, but the user must remember this. They do not automatically lock.

SUMMARY OF THE INVENTION

Improvements herein that apply to both the roof rack and hitch receiver versions of the inventor's bike carrier include infinite tool-less adjustability of the cross member position along the wheel retention arms to tighten and release the cross member anywhere along elongated slots in the side arms of the retention arms to adjust for bike tire diameter.

In combination, the existing and new features on both the roof rack and hitch receiver versions of the present bike carrier provide:

(a) Retains the bike only by the tires. Does not scratch the bike frame;
(b) Quick infinite adjustment for bike wheels of different diameters without tools;
(c) Bike loads/unloads quickly using only one operation;
(d) No straps or other secondary retention needed;
(e) Locks the bike steering to prevent damage;
(f) Prevents the wheels from spinning in the vehicle slipstream.

BRIEF DESCRIPTION OF THE DRAWINGS

The invention is explained in the following description in view of the drawings that show:

FIG. 1 is a side view of a bike carrier for a car roof rack according to aspects of the invention.

FIG. 2 is a sectional view along line 2-2 of FIG. 1, showing a bike tire retained by a wheel retention arm.

FIG. 3 is a view as in FIG. 2 showing the wheel retention arm adjusted for a smaller tire diameter.

FIG. 4 is a sectional view along line 4-4 of FIG. 1, showing aspects of a ratchet mechanism for the wheel retention arm.

FIG. 5 is a back view of a bike carrier for a trailer hitch receiver according to aspects of the invention.

FIG. 7 is a top view of the bike carrier of FIG. 5 with the wheel retention arms folded down to the wheel trays.

GLOSSARY

Figure 6:
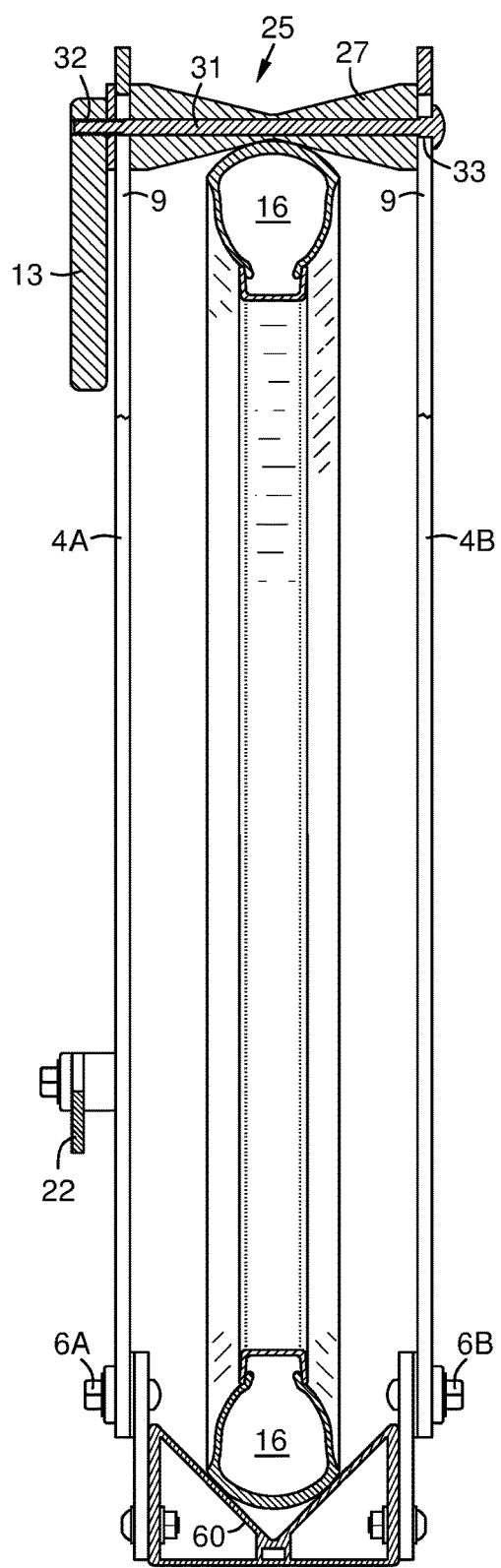
FIG. 6 is a sectional view taken on line 6-6 of FIG. 5 showing an embodiment of a cross member adjustment mechanism.

"Bike" herein means a two-wheeled vehicle, including velocipede bicycles and motorcycles.

"Front" and "back" are oriented with a motor vehicle to which the bike carrier is attached. Thus, a "side view" of the roof rack carrier shows the side of a bike in the carrier, while a "back view" of the hitch receiver carrier shows the side of the bike.

"H-shaped or inverted U-shaped" herein includes a range of positions of the cross member on the wheel retention arms. If the cross member is at the top of the side members it becomes an inverted U-shape.

"Longitudinal" means parallel to the longest dimension of the subject component.

"Transverse" means perpendicular to the longest dimension of the subject component.

DETAILED DESCRIPTION OF THE INVENTION

FIG. 1 is a side view of a bike carrier 1A mounted on a car roof rack 101. An elongated horizontal tray 2 receives the tires 16, 17 of a bike 3. The tray 2 may be a V-channel or U-channel extrusion that is concave upward. A wheel retention arm 4, 5 is attached pivotally 6, 7 near each end of the tray. The retention arms are H-shaped or inverted U-shaped as later shown. Each wheel retention arm may have elongated slots 9 to adjust the position of a cross member (later shown) for different wheel diameters via a quick-release cam lever 11 or other tool-less device. Each retention arm 4, 5 pivots inward 14, 15 until the cross member contacts the tire 16, 17 of the nearest wheel. The arm is locked against this tire by a ratchet mechanism 20, 21 acting through a stay 22, 24 connected between the pawl and the retention arm 4, 5. This causes the tires to be bracketed between the arms, securing the bike in all directions by its tires. The ratchet mechanism moves along a ratchet bar 19, and locks on the bar to prevent outward pivoting of the wheel retention arms until a lever 26 is operated to release the pawl. The retention arms may pivot fully inward to the tray when the rack is not in use. Once adjusted and positioned for a given bike size, only one of the retention arms needs to be pivoted for insertion and removal of a bike of that size.

Each arm contacts the tire of the nearest wheel at a point above and outward from the wheel axle with respect to the bike. This brackets and blocks the bike from moving, both along the tray and vertically. The bike is held firmly in place and cannot bounce upward or roll off the tray. The arms contact only the tires.

FIG. 2 is a sectional view taken along line 2-2 of FIG. 1, showing a tire 16 in the tray 2 and a wheel retention arm 4 contacting the tire with a cross member 25. The wheel retention arm has two side arms 4A, 4B attached by coaxial pivot points 6A, 6B to opposite sides of the tray 2. The cross member 25 is attached between the two side arms through the slots 9 (FIG. 1) in the side arms by means of a quick release cam lever 11 mechanism. This can be a conventional quick release device for attaching bicycle wheels to the forks of a bicycle. The side arms 4A, 4B may have a spacing at or near a widest conventional bicycle dropout spacing so wide tires can be accommodated and an off-the-shelf wheel quick release device can be used. The cross member 25 includes a retention arm separator 27, which may be formed in a bi-conic shape with a waist to receive the tire.

FIG. 3 shows the same viewpoint as FIG. 2, with the cross member 25 moved downward for a smaller tire 30. The cam lever 11 is shown in an alternate loosened position 11B. The cross member 25 and side arms 4A, 4B form an H-shaped or inverted U-shaped configuration, depending on the position of the cross member. The quick-release mechanism is shown partly in section to show the shaft 31 or skewer passing through the separator 27. The shaft 31 passes through the slots 9 and the separator 27 from the cam 28 to a nut 29. Cam tension on the shaft is adjusted with the nut 29, then the nut does not need to be loosened again, and can remain at a setpoint, optionally with assistance from a thread locking compound or other means.

FIG. 4 is a sectional view taken along line 4-4 of FIG. 1, showing aspects of the ratchet mechanism 20. A linear ratchet bar 34 has a pawl assembly 36 that holds a finger 38 against the bottom side of the ratchet bar. A pawl release lever 26 releases the finger from the ratchet bar. An over-rotation stop 42 prevents over-rotating the pawl assembly in the release direction. The ratchet bar 34 may be toothed or toothless.

FIG. 5 is a back view of a bike carrier 1B for a trailer hitch receiver according to aspects of the invention. A bike 3 is mounted on the carrier by placing its wheels 16, 17 in respective wheel trays 60, 61. These trays may be extrusions such as U-channel or V-channel that are convex upward to retain the wheels and lock the steering of the bike. This bike carrier has similar main elements and operation to the roof rack carrier described above, but includes additional elements 7 related to mounting the carrier to the receiver hitch of a vehicle. It may provide a separate tray 60, 61 for each wheel 16, 17 enabling the trays to be folded together forward for compact shipping and storage.

FIG. 6 is a sectional view taken on line 6-6 of FIG. 5 showing a bike wheel 16 held between a wheel tray 60 and a cross member 25 that spans between first and second side arms 4A, 4B of the retention arm 4 of FIG. 5. The cross member may be tensioned and loosened with a lever 13 for adjustment. The lever may be threaded 32 onto the shaft 31 to act as both a nut and a wrench on the shaft 31. The shaft 31 may be a carriage bolt as shown, with the square neck 33 of the bolt in the elongated slot 9 to index the bolt to the elongated slot. The square neck slides within the elongated slot for adjusting the position of the cross member when tension on the shaft 31 is released by the lever 13. The retention side arms 4A, 4B may be attached to a distal end of the wheel tray 60 with respective coaxial pivotal connections 6A, 6B.

FIG. 7 is a top view of the bike carrier of FIG. 5 with the wheel retainer arms 4A, 4B and 5A, 5B folded down to the wheel trays 60, 61. A trailer hitch drawbar 64 is attached to the trays via a drawbar assembly 66 comprising a horizontal cross bar 68 attached to the drawbar, and left and right vertically oriented pivot plates 70, 71 attached to the cross bar. The drawbar may have a spring-loaded captive pin 65 or other means that retains the drawbar in the hitch receiver. It may have an internal mechanism, not shown, operated by a lever 96 for tightening the drawbar in the trailer hitch receiver tube. A padlock 69 may secure the lever 96. A tray assembly 75 comprises left and right tray assembly plates 78, 79 attached to the drawbar assembly on a horizontal pivot axis 80, allowing the tray assembly 75 to pivot upward about the axis 80 to a compact upward position behind the motor vehicle. The pivot axis may be implemented by a pivot axle journaled in a pivot cross member 81 between the pivot plates 70, 71 that serves as a structural member of the drawbar assembly. The pivot position of the tray assembly is locked with a pivot lock bar 82 operated by a trigger bar 84 via a manual trigger 85 at the back of the tray assembly 75.

The trays 60, 61 are mounted to the tray assembly 75 by respective pivot attachments 62, 63, so they can pivot 90 between the shown operational co-aligned laterally extending position and a compact forward position over the drawbar assembly 66 for shipping and storage. Bike wheel retention arm 4 of FIG. 5 here comprises side arms 4A, 4B attached to tray 60 by coaxial pivot attachments 6A, 6B. Bike wheel retention arm 5 of FIG. 5 here comprises side arms 5A, 5B attached to tray 61 by coaxial pivot attachments 7A, 7B. A cross member 25 spans between each pair of side arms 4A, 4B, and 5A, 5B. Each cross member has a tensioning/loosening lever 13.

While various embodiments of the present invention have been shown and described herein, such embodiments are provided by way of example only. Numerous variations, changes and substitutions may be made without departing from the invention herein. Accordingly, it is intended that the invention be limited only by the spirit and scope of the appended claims.

The invention claimed is:

1. A bike carrier comprising:
   a bike wheel carrying tray for holding a wheel of a bike;
   a wheel retention arm pivotally attached to a distal end of the tray, the wheel retention arm comprising two side arms and a cross member between them that contacts a tire of the wheel;
   wherein the cross member is mounted between respective opposed elongated slots in the side arms at a selectable position along a length of the side arms by a releasable mechanism that allows the cross member to move along the elongated slots to adjust for different diameters of bike wheels.

2. The bike carrier of claim 1, wherein the cross member of the wheel retention arm is infinitely adjustable along the opposed elongated slots in the side arms thereof.

3. The bike carrier of claim 1, wherein the releasable mechanism comprises a quick-release cam lever that tensions and releases a shaft of the cross member.

4. The bike carrier of claim 1, wherein the releasable mechanism comprises a lever with transversely oriented internal threads that receive a threaded end of a shaft of the cross member, wherein the lever acts as both a nut and a wrench on the shaft of the cross member.

5. The bike carrier of claim 4, wherein the shaft of the cross member comprises a carriage bolt with a square neck thereof disposed in the elongated slot of one of the side arms of the wheel retention arm, wherein the square neck disposed in the elongated slot indexes the carriage bolt to the elongated slot and slides within the elongated slot when tension on the shaft is released by the lever.

6. The bike carrier of claim 1, wherein the cross member comprises:
   a separator that holds the side arms apart, the separator comprising a waist that contacts a tire of the bike; and
   a shaft through the separator and through the elongated slots in the arms;
   wherein the releasable mechanism comprises a tool-less tensioner on an end of the shaft that tensions and loosens the shaft, fixing the cross member to, and releasing it from, the selectable position on the side arms.

7. The bike carrier of claim 1, further comprising a retention arm pivot ratchet acting through a stay between the wheel retention arm and the tray, wherein the pivot ratchet allows inward pivoting of the wheel retention arm, locks the retention arm with the cross member pressed against the tire of the wheel, and is releasable to allow the retention arm to pivot outward to release the bike from the carrier.

8. A bike carrier comprising:
   first and second bike wheel carrying trays for holding respective first and second wheels of a bike;
   an H-shaped or inverted U-shaped wheel retention arm pivotally attached to a distal end of each of the trays, each wheel retention arm comprising two parallel side arms and a cross member between them that contacts a tire of the respective wheel of the bike;
   wherein the cross member of each wheel retention arm is mounted between respective opposed elongated slots in the parallel side arms at a selectable position along a length of the parallel side arms by a releasable mechanism that allows the cross member to move along the elongated slots to adjust for different diameters of bike wheels.

9. The bike carrier of claim 8, wherein each cross member of each wheel retention arm is infinitely adjustable along the opposed elongated slots in the parallel side arms thereof for different bike wheel diameters.

10. The bike carrier of claim 8, wherein the releasable mechanism comprises a quick-release cam lever that tensions and loosens a shaft of the cross member.

11. The bike carrier of claim 8, wherein each cross member comprises:
    a separator that holds the parallel side arms apart, the separator comprising a waist that contacts a tire of the bike; and
    a shaft through the separator and through the elongated slots in the parallel arms;
    wherein the releasable mechanism comprises a tool-less tensioner on an end of the shaft that tensions and loosens the shaft, fixing the cross member to, and releasing it from, the selectable position on the parallel side arms.

12. The bike carrier of claim 8, wherein the releasable mechanism comprises a lever with transversely oriented internal threads that receive a threaded end of a shaft of the cross member, wherein the lever acts as both a nut and a wrench on the shaft of the cross member.

13. The bike carrier of claim 12, wherein the shaft of the cross member comprises a carriage bolt with a square neck thereof disposed in the elongated slot of one of the parallel side arms of the wheel retention arm, wherein the square neck disposed in the elongated slot indexes the carriage bolt to the elongated slot and slides within the elongated slot when tension on the shaft is released by the lever.

14. The bike carrier of claim 8, further comprising a retention arm pivot ratchet acting on a stay between each wheel retention arm and the tray to which it is attached, wherein the pivot ratchet allows inward pivoting of the wheel retention arm, locks the retention arm with the cross member pressed against the tire of the respective wheel, and is releasable to allow the retention arm to pivot outward to release the bike from the carrier.

* * * * *